United States Patent
Takamoto

(10) Patent No.: US 11,526,394 B2
(45) Date of Patent: Dec. 13, 2022

(54) METHOD OF CONTROLLING INFORMATION PROCESSOR, NON-TRANSITORY CONTROLLER-READABLE MEDIUM STORING PROGRAM, AND COMMUNICATION SYSTEM

(71) Applicant: SEIKO EPSON CORPORATION, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 166 days.

(21) Appl. No.: 16/930,661

(22) Filed: Jul. 16, 2020

(65) Prior Publication Data

US 2021/0019222 A1    Jan. 21, 2021

(30) Foreign Application Priority Data

Jul. 19, 2019   (JP) .............................. JP2019-133437

(51) Int. Cl.
  *G06F 11/07*   (2006.01)
  *G06Q 20/20*   (2012.01)

(52) U.S. Cl.
  CPC ...... *G06F 11/0793* (2013.01); *G06F 11/0709* (2013.01); *G06F 11/0751* (2013.01); *G06Q 20/20* (2013.01)

(58) Field of Classification Search
  CPC ............. G06F 11/0772; G06F 11/0751; G06F 11/0757; G06F 11/0793; G06F 11/0745
  See application file for complete search history.

(56) References Cited

U.S. PATENT DOCUMENTS

| | | | | |
|---|---|---|---|---|
| 5,943,503 A | * | 8/1999 | Kai ....................... | G06F 3/1207 358/1.14 |
| 6,389,544 B1 | * | 5/2002 | Katagiri ................ | G06F 3/1229 713/340 |
| 7,232,063 B2 | * | 6/2007 | Fandel ..................... | G07G 1/14 235/383 |
| 2021/0019212 A1 | * | 1/2021 | Takamoto ........... | G06F 11/3055 |

FOREIGN PATENT DOCUMENTS

JP        H07-016190 B    2/1995

* cited by examiner

*Primary Examiner* — Nadeem Iqbal
(74) *Attorney, Agent, or Firm* — Workman Nydegger

(57) ABSTRACT

A POS terminal has: a device driver; a POS application that communicates with a peripheral through the device driver; a filter driver that acquires communication information related to communication performed between the POS application and the peripheral through the device driver; and a failure detection application that acquires communication information from the filter driver over a predetermined period, defines a decision reference according to which a decision is made about an abnormality related to the peripheral, according to the acquired communication information, and makes a decision about an abnormality related to the peripheral through a comparison between the defined decision reference and communication information acquired from the filter driver after the predetermined period.

15 Claims, 8 Drawing Sheets

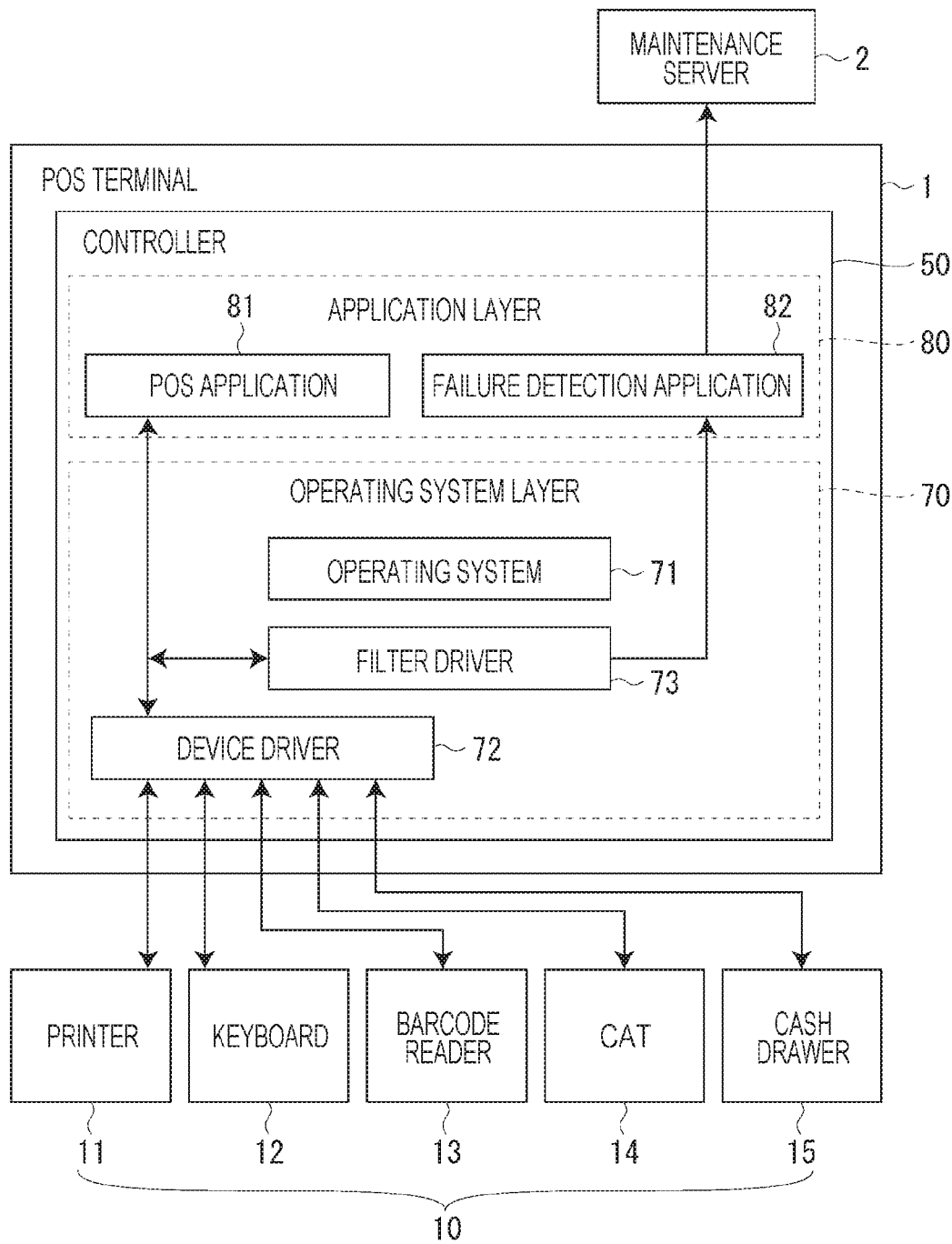

FIG. 4

| COMMUNICATION SEQUENCE | EVENT | COMMUNICATION INTERVAL |
|---|---|---|
| 1 | INPUT BY THE ACCOUNTING PROCESSING BUTTON ON THE KEYBOARD | — |
| 2 | INPUT OF PRODUCT CODE A BY THE BARCODE READER | 5 SECONDS |
| 3 | INPUT OF PRODUCT CODE B BY THE BARCODE READER | 5 SECONDS |
| 4 | INPUT OF A RECEIVED AMOUNT FROM THE KEYBOARD | 5 SECONDS |
| 5 | INPUT BY THE ACCOUNTING BUTTON ON THE KEYBOARD | 30 SECONDS |
| 6 | OUTPUT OF RECEIPT PRINTING DATA TO THE PRINTER | 1 SECOND |
| 7 | OUTPUT OF A DRAWER OPENING SIGNAL TO THE CASH DRAWER | 0 SECONDS |
| 8 | INPUT OF A DRAWER CLOSED SIGNAL FROM THE CASH DRAWER | 30 SECONDS |

FIG. 5

| COMMUNICATION SEQUENCE | EVENT | COMMUNICATION INTERVAL |
|---|---|---|
| 1 | INPUT BY THE ACCOUNTING PROCESSING BUTTON ON THE KEYBOARD | — |
| 2 | INPUT OF PRODUCT CODE A BY THE BARCODE READER | 5 SECONDS |
| 3 | INPUT OF PRODUCT CODE B BY THE BARCODE READER | 5 SECONDS |
| 4 | INPUT BY THE CREDIT CARD PAYMENT BUTTON ON THE KEYBOARD | 5 SECONDS |
| 5 | OUTPUT OF SETTLEMENT INFORMATION TO THE CAT | 2 SECONDS |
| 6 | INPUT OF A PAYMENT COMPLETION NOTIFICATION BY THE CAT | 5 SECONDS |
| 7 | OUTPUT OF RECEIPT PRINTING DATA TO THE PRINTER | 1 SECOND |

FIG. 6

| TARGET ABOUT WHICH A DECISION IS TO BE MADE | TIME LIMIT |
|---|---|
| FROM THE INPUT OF A RECEIVED AMOUNT FROM THE KEYBOARD TO AN INPUT BY THE ACCOUNTING BUTTON ON THE KEYBOARD | 60 SECONDS |
| FROM AN INPUT BY THE ACCOUNTING BUTTON ON THE KEYBOARD TO THE OUTPUT OF RECEIPT PRINTING DATA TO THE PRINTER | 3 SECONDS |
| FROM AN INPUT BY THE ACCOUNTING BUTTON ON THE KEYBOARD TO THE OUTPUT OF A DRAWER OPENING SIGNAL TO THE CASH DRAWER | 3 SECONDS |
| FROM THE OUTPUT OF A DRAWER OPENING SIGNAL TO THE CASH DRAWER TO THE INPUT OF A DRAWER CLOSED SIGNAL FROM THE CASH DRAWER | 60 SECONDS |
| FROM THE INPUT OF A PAYMENT COMPLETION NOTIFICATION BY THE CAT TO THE OUTPUT OF RECEIPT PRINTING DATA TO THE PRINTER | 3 SECONDS |

J1 → (points to first data row)

METHOD OF CONTROLLING INFORMATION PROCESSOR, NON-TRANSITORY CONTROLLER-READABLE MEDIUM STORING PROGRAM, AND COMMUNICATION SYSTEM

The present application is based on, and claims priority from JP Application Serial Number 2019-133437, filed Jul. 19, 2019, the disclosure of which is hereby incorporated by reference herein in its entirety.

BACKGROUND

1. Technical Field

The present disclosure relates to a method of controlling an information processor, a non-transitory controller-readable medium storing a program, and a communication system.

2. Related Art

Japanese Examined Patent Application Publication No. 07-016190, for example, discloses a conventional technology by which a communication abnormality is recognized when a difference between the number of data receptions and the number of data transmissions reaches a predetermined number of times in a communicator that adds its own data to data received from an apparatus disposed upstream and transmits the resulting data to an apparatus disposed downstream.

With the technology disclosed in Japanese Examined Patent Application Publication No. 07-016190, it is not easy to add a function to recognize a communication abnormality to an existing system because, for example, a need arises to modify an existing application incorporated into the communicator.

SUMMARY

A method, in an embodiment of the present disclosure, of controlling a an information processor is a method of controlling an information processor configured to communicate with a peripheral, the information processor having a device driver, an application configured to communicate with the peripheral through the device driver, and a filter driver configured to acquire communication information related to communication performed between the application and the peripheral through the device driver. The method includes: acquiring communication information from the filter driver over a predetermined period; defining a decision reference according to which a decision is made about an abnormality caused during communication with the peripheral or an abnormality in the peripheral, according to the acquired communication information; and making a decision about an abnormality caused during communication with the peripheral or an abnormality in the peripheral through a comparison between the defined decision reference and communication information acquired from the filter driver after the predetermined period.

A non-transitory controller-readable medium in an embodiment of the present disclosure stores a program causing a processor in an information processor configured to communicate with a peripheral, the information processor having a device driver, an application configured to communicate with the peripheral through the device driver, and a filter driver configured to acquire communication information related to communication performed between the application and the peripheral through the device driver, to acquire communication information from the filter driver over a predetermined period, to define a decision reference according to which a decision is made about an abnormality caused during communication with the peripheral or an abnormality in the peripheral, according to the acquired communication information, and to make a decision about an abnormality caused during communication with the peripheral or an abnormality in the peripheral through a comparison between the defined decision reference and communication information acquired from the filter driver after the predetermined period.

A communication system in an embodiment of the present disclosure includes: a peripheral; and an information processor configured to have a device driver, a first application configured to communicate with the peripheral through the device driver, a filter driver configured to acquire communication information related to communication performed between the first application and the peripheral through the device driver, and a second application configured to acquire communication information from the filter driver over a predetermined period, to define a decision reference according to which a decision is made about an abnormality caused during communication with the peripheral or an abnormality in the peripheral, according to the acquired communication information, and to make a decision about an abnormality caused during communication with the peripheral or an abnormality in the peripheral through a comparison between the defined decision reference and communication information acquired from the filter driver after the predetermined period.

BRIEF DESCRIPTION OF THE DRAWINGS

FIG. 3 is a block diagram illustrating the software structure of a controller.

FIG. 4 illustrates an example of communication information acquired at the time of payment with cash.

FIG. 5 illustrates an example of communication information acquired at the time of payment with a credit card.

FIG. 6 illustrates an example of decision references.

DESCRIPTION OF EXEMPLARY EMBODIMENTS

Figure 1:
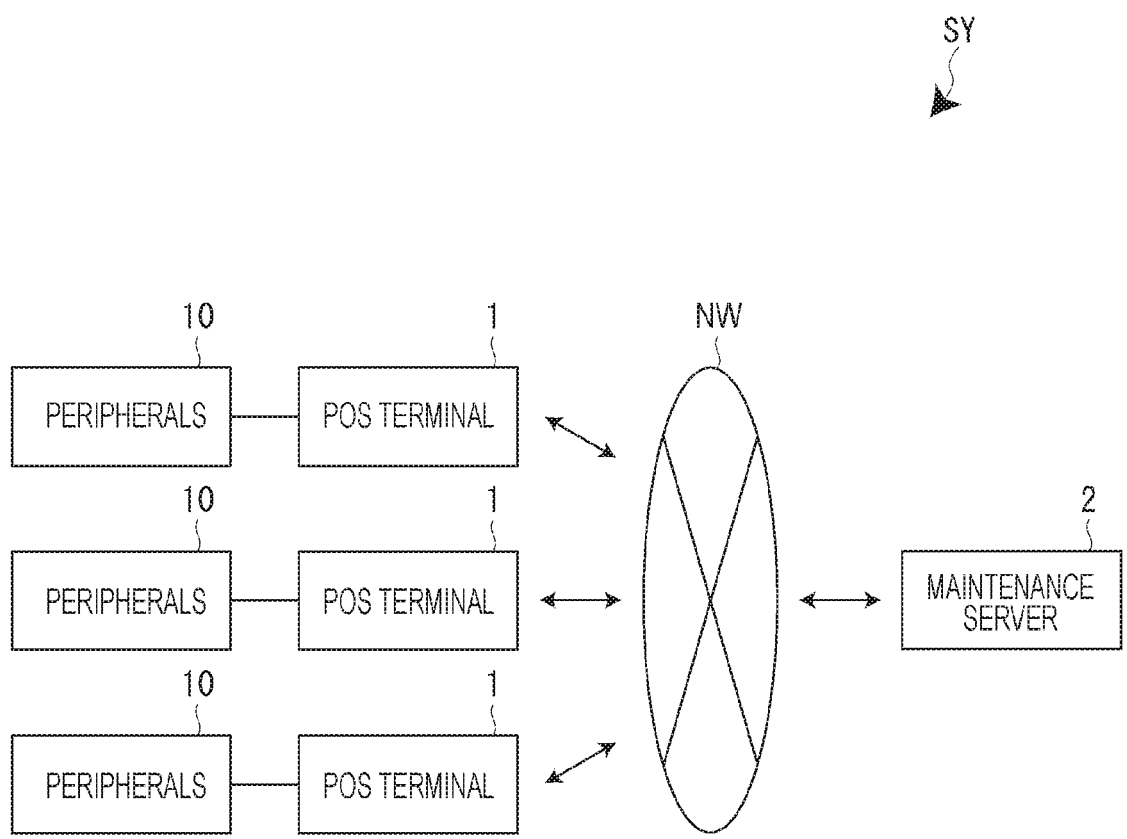
FIG. 1 illustrates the system structure of a communication system.

A method of controlling an information processor, a non-transitory controller-readable medium storing a program, and a communication system according to an embodiment will be described below with reference to the attached drawings. FIG. 1 illustrates the structure of a communication system SY. The communication system SY has one or more point-of-sale system (POS) terminals 1, peripherals 10, each of which is coupled to one POS terminal 1, and a maintenance server 2. Each POS terminal 1 and the maintenance server 2 are coupled together through a network NW. The network NW is, for example, an Internet communication network or a local area network (LAN). The POS terminal 1 is an example of an information processor. The maintenance server 2 is an example of an external server.

The POS terminal 1, also referred to as a cash register, performs accounting processing at a retail store such a supermarket or convenience store. Accounting processing includes input of product information, settlement, the issuing of accounting receipts, and other processing.

The maintenance server 2 is, for example, a server operated by a maintenance and management service company responsible for maintenance and management of the POS terminals 1. The maintenance server 2 acquires various types of information from the POS terminals 1 coupled to the maintenance server 2 through the network NW, and provides maintenance and management services according to the acquired information. For example, upon the acquisition of error information from a POS terminal 1, the maintenance server 2 displays, on the display screen, the error information and information that identifies the POS terminal 1 that has transmitted the error information. An operator at the maintenance and management service company confirms the occurrence of the error, after which the operator makes contact with a person in charge at the retail store by telephone, dispatches a service person, and performs other services.

The POS terminal 1 in this embodiment collects communication information related to communication with the relevant peripheral 10, and decides whether there is an abnormality caused during communication with the peripheral 10 and whether the peripheral 10 has an abnormality according to the collected information. When the POS terminal 1 decides that there is an abnormality caused during communication with the peripheral 10 or that the peripheral 10 has an abnormality, the POS terminal 1 notifies the maintenance server 2 of the abnormality. An example of an abnormality caused during communication with the peripheral 10 is a break in communication between the POS terminal 1 and the peripheral 10. An example of an abnormality in the peripheral 10 is an error in the peripheral 10. In the description below, an abnormality caused during communication with the peripheral 10 or an abnormality in the peripheral 10 will be referred to as an abnormality related to the peripheral 10.

Figure 2:
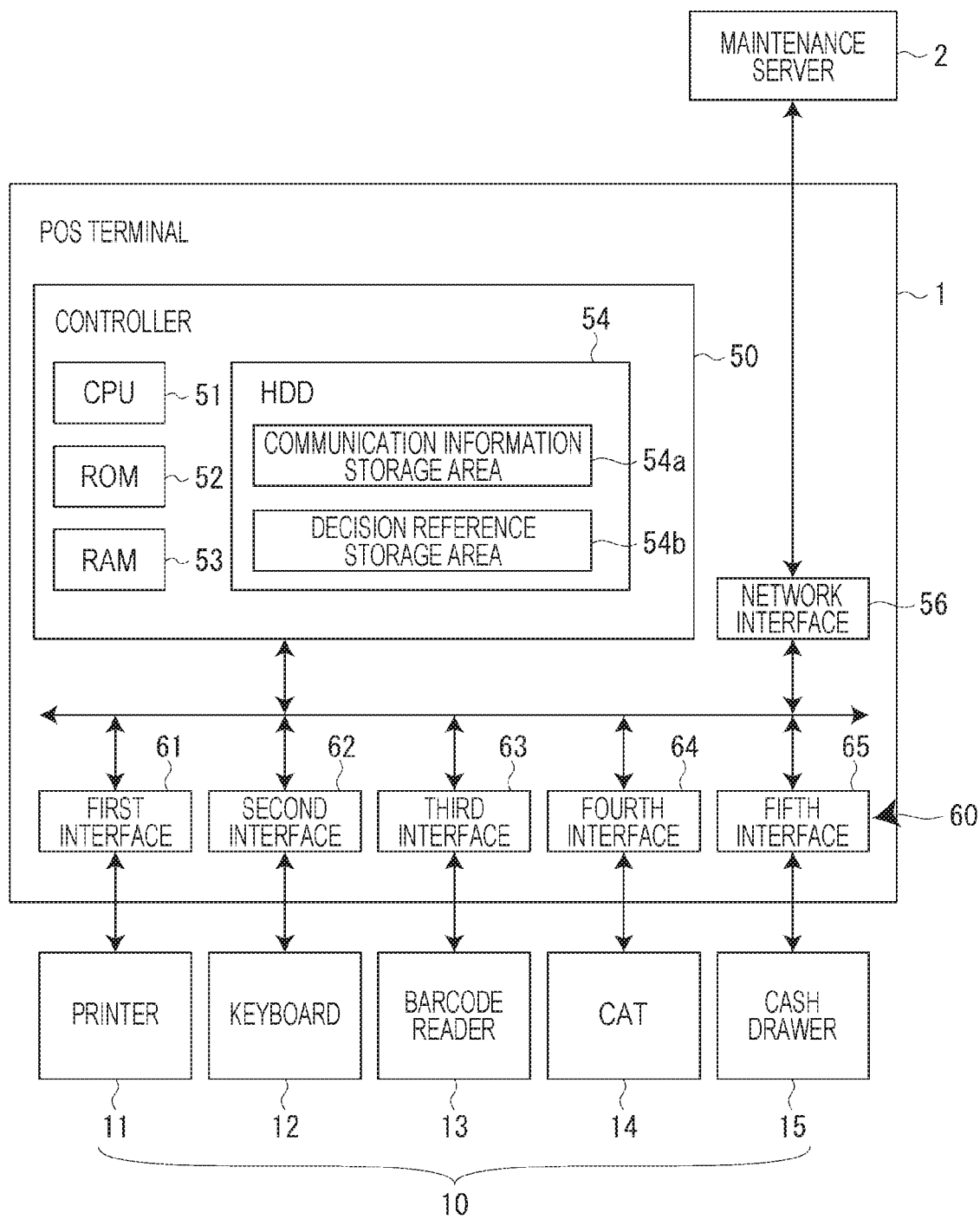
FIG. 2 is a block diagram illustrating the hardware structure of a POS terminal.

The peripheral 10 is assumed to be a printer 11, a keyboard 12, a barcode reader 13, a credit authorization terminal (CAT) 14, a cash drawer 15, or another device involved in accounting processing (see FIG. 2 and other drawings).

In this embodiment, the POS terminal 1 and peripherals 10 are mutually coupled through serial interfaces. Among the peripherals 10 coupled through the serial interfaces, changes in signal lines and the communication protocol differ depending on the peripheral 10. Therefore, the POS terminal 1 cannot monitor the states of these peripherals 10 in a unified manner. This makes it difficult for the POS terminal 1 to decide whether there is an abnormality related to the peripheral 10.

In view of this, the POS terminal 1 in this embodiment acquires communication information over a predetermined period and defines a decision reference according to which a decision is made about an abnormality related to the peripheral 10, according to communication information acquired over the predetermined period. Then, the POS terminal 1 compares the communication information acquired during accounting processing with the defined decision reference to make a decision about an abnormality related to the peripheral 10. A method of defining a decision reference and a method of making a decision about an abnormality related to the peripheral 10 will be mainly described below.

FIG. 2 is a block diagram illustrating the hardware structure of the POS terminal 1. The POS terminal 1 has a controller 50, a network interface 56, and a serial interface group 60 as main hardware components. The controller 50 is an example of a processor.

The controller 50 includes a central processing unit (CPU) 51, a read-only memory (ROM) 52, a random-access memory (RAM) 53, and a hard disk drive (HDD) 54. The CPU 51 is a processor. The ROM 52 is a memory that stores control programs. The RAM 53 is a memory used as a work area. To perform various types of computation processing, the CPU 51 reads out programs stored in the ROM 52 or HDD 54, loads the read-out programs into the RAM 53, and executes these programs.

The controller 50 may use a processor other than the CPU 51. A processor may be structured with a hardware circuit such as, for example, an application-specific integrated circuit (ASIC). The processor may also be structured so that at least one CPU and a hardware circuit such as an ASIC operate in cooperation.

The HDD 54, which is a non-volatile auxiliary storage, has a communication information storage area 54a and a decision reference storage area 54b. The communication information storage area 54a stores communication information acquired by the CPU 51. The communication information storage area 54a is an example of a storage. The decision reference storage area 54b stores the decision reference defined by the CPU 51.

The network interface 56 communicates with the maintenance server 2 through the network NW.

The serial interface group 60 includes a first interface 61, a second interface 62, a third interface 63, a fourth interface 64, and a fifth interface 65.

The first interface 61 is coupled to the printer 11. The second interface 62 is coupled to the keyboard 12. The third interface 63 is coupled to the barcode reader 13. The fourth interface 64 is coupled to the CAT 14. The fifth interface 65 is coupled to the cash drawer 15.

The printer 11 prints accounting receipts. The keyboard 12 has various buttons such as an accounting processing start button, an accounting button, and a credit card payment button. The keyboard 12 accepts a manipulation of a button by the person at the checkout counter, who is the operator of the cash register. The barcode reader 13 reads a barcode attached to or printed on a product and acquires a product code. The CAT 14 is a terminal on which payment with a credit card is performed. The CAT 14 transmits settlement information to a credit card information processing center and receives a settlement completion notification from the credit card information processing center. The cash drawer 15 is a device that stores cash in a drawer.

FIG. 3 is a block diagram illustrating the software structure of the controller 50 in the POS terminal 1. As illustrated in the drawing, the controller 50 has an operating system layer 70 and an application layer 80 as a software hierarchy.

An operating system 71, a device driver 72, and a filter driver 73 are incorporated into the operating system layer 70. A POS application 81 and a failure detection application 82 are incorporated into the application layer 80. The POS application 81 is an example of a first application. The failure detection application 82 is an example of a second application and a program.

The operating system 71, device driver 72, filter driver 73, POS application 81, and failure detection application 82 are all stored in the HDD 54 (memory).

The operating system 71 is a software program that manages the entire operation of the controller 50. The device driver 72 is a software program through which data is received and output between the controller 50 and peripherals 10. The filter driver 73 is a software program that acquires, through the device driver 72, communication information received and output between the POS application 81 and the peripherals 10. The POS application 81 is a software program that performs accounting processing.

The failure detection application 82 is software program that defines a decision reference and makes a decision about an abnormality related to the peripheral 10. The CPU 51 reads out the failure detection application 82 from the HDD 54 and executes the failure detection application 82 to acquire communication information from the filter driver 73 over a predetermined period and to store the acquired communication information in the communication information storage area 54a. The CPU 51 also defines a decision reference according to the communication information acquired over the predetermined period and stored in the communication information storage area 54a, and stores the defined decision reference in the decision reference storage area 54b. The CPU 51 also compares communication information acquired by the filter driver 73 after the elapse of the predetermined period with the decision reference stored in the decision reference storage area 54b, and makes a decision about an abnormality related to the peripheral 10.

When the CPU 51 reads out the failure detection application 82 from the HDD 54 and executes the failure detection application 82, the CPU 51 further transmits, to the maintenance server 2, communication information acquired when the CPU 51 decides that there is an abnormality in the peripheral 10. The maintenance server 2 displays the communication information on the display screen. The operator of the maintenance server 2 confirms the communication information and makes a decision about the communication information as to whether to recognize the abnormality. The maintenance server 2 then transmits, to the POS terminal 1, decision information indicating a result of the decision as to whether to recognize the abnormality. Upon receipt of the decision information from the maintenance server 2, the CPU 51 updates the decision reference according to the received decision information.

Specific examples will be described below to explain decision reference defining processing to define a decision reference by using the failure detection application 82 and to explain abnormality deciding processing to make a decision about an abnormality related to the peripheral 10. In the description below, the main body for processing executed by the CPU 51 in the controller 50 will be simply referred to as the controller 50.

FIG. 4 illustrates an example of communication information acquired by the filter driver 73 at the time of payment with cash. Communication information is involved in a transaction in accounting processing. Communication information is acquired at least once in accounting processing performed once, that is, in one transaction in accounting processing.

As illustrated in the drawing, communication information includes positions in a communication sequence, events, and intervals in communication. Positions in the communication sequence indicate a sequence in which communication is performed with a plurality of peripherals 10. An event indicates the operation of a peripheral 10 when communication is performed. A communication interval indicates a time interval at which communication occurs. That is, a communication interval indicates a time interval from when communication accompanying the occurrence of one event is terminated until communication accompanying the occurrence of a next event starts. A communication interval in communication at the second, fourth, sixth, and seventh positions in the communication sequence is an example of information indicating a time interval from when communication with one peripheral 10 is terminated until communication with another peripheral 10 starts. The controller 50 has a real time clock (RTC), so the CPU 51 can acquire, from the RTC, a time at which a predetermined event or communication has occurred and a time interval.

In the example in FIG. 4, the communication interval between communication at the first position in the communication sequence and communication at the second position therein, for example, is 5 seconds. That is, the example indicates that, after the elapse of 5 seconds from the occurrence of an event in which an input by the accounting processing button on the keyboard 12 was made, an event occurred in which product code A was input by the barcode reader 13.

In the case of payment with cash, the controller 50 generally acquires communication information in a communication sequence described below. First, the controller 50 acquires communication information involved in an input by the accounting processing button on the keyboard 12 (at the first position in the communication sequence), after which, each time a product code is input by the barcode reader 13, the controller 50 acquires communication information involved in the input of the product code (at the second and third positions in the communication sequence). The controller 50 then acquires communication information involved in the input of a received amount from the keyboard 12 (at the fourth position in the communication sequence), and further acquires communication information involved in an input by the accounting button on the keyboard 12 (at the fifth position in the communication sequence).

Then, the controller 50 acquires communication information involved in the output of receipt printing data to the printer 11 (at the sixth position in the communication sequence), and further acquires communication information involved in the output of a drawer opening signal to the cash drawer 15 (at the seventh position in the communication sequence). The generation of the events at the sixth and seventh positions in the communication sequence is triggered by an input by the accounting button. The controller 50 then acquires communication information involved in the input of a drawer closed signal from the cash drawer 15 when the cash drawer 15 is manually closed (at the eighth position in the communication sequence).

FIG. 5 illustrates an example of communication information acquired by the filter driver 73 at the time of payment with a credit card. In the case of payment with a credit card, the controller 50 generally acquires communication information in a communication sequence described below. First, the controller 50 acquires communication information involved in an input by the accounting processing button on the keyboard 12 (at the first position in the communication sequence), after which, each time a product code is input by the barcode reader 13, the controller 50 acquires communication information involved in the input of the product code (at the second and third positions in the communication sequence).

The controller 50 then acquires communication information involved in an input by the credit card payment button on the keyboard 12 (at the fourth position in the communication sequence), and further acquires communication information involved in the output of settlement information to the CAT 14 (at the fifth position in the communication sequence). The settlement information includes a settlement amount, the number of payments, and other information. The generation of the event at the fifth position in the communication sequence is triggered by an input by the credit card payment button. Then, the controller 50 acquires communication information involved in the input of a payment completion notification by the CAT 14 (at the sixth position in the communication sequence), and further acquires communication information involved in the output of receipt printing data to the printer 11 (at the seventh position in the communication sequence). The generation of the event at the seventh position in the communication sequence is triggered by the input of a payment completion notification by the CAT 14.

In the examples in FIGS. 4 and 5, in a plurality of operations performed on one peripheral 10 in succession, positions in a communication sequence have been assigned as different pieces of communication information. However, when a plurality of operations are performed on one peripheral 10 in succession, positions in a communication sequence may be assigned as one piece of communication information. In the example in FIG. 4, for example, the second and third positions, the fourth and fifth positions, and the seventh and eighth positions each may be combined into one position in a communication sequence. In this case, a communication interval in each communication is information indicating a time interval from when communication with one peripheral 10 is terminated until communication with another peripheral 10 starts.

FIG. 6 illustrates an example of decision references. A decision reference is information in which a target about which a decision is to be made and a time limit are mutually associated. The time limit is the length of time up to which the controller 50 decides that there is no abnormality related to the peripheral 10. For example, a first decision reference J1, which is the first of the five decision references indicated in the drawing, indicates that when, in the case of payment with cash, a communication interval from when communication accompanying the input of a received amount from the keyboard 12 is terminated until communication accompanying an input by the accounting button on the keyboard 12 starts exceeds 60 seconds, which is a time limit, that is, is longer than 60 seconds, the controller 50 decides that there is an abnormality related to the peripheral 10.

For example, it will be assumed that communication information illustrated in FIG. 4 is acquired with the first decision reference J1 stored in the decision reference storage area 54*b*. Since the communication interval between communication at the fourth position in the communication sequence and communication at the fifth position therein is 30 seconds, the controller 50 decides that there is no abnormality related to the peripheral 10.

Referring again to FIG. 6, when, in the case of payment with cash, the communication interval from when communication accompanying an input by the accounting button on the keyboard 12 is terminated until communication accompanying the output of receipt printing data to the printer 11 starts exceeds three seconds, it is decided that there is an abnormality related to the peripheral 10. Similarly, when, in the case of payment with cash, the communication interval from when communication accompanying an input by the accounting button on the keyboard 12 is terminated until communication accompanying the output of a drawer opening signal to the cash drawer 15 starts exceeds three seconds, it is decided that there is an abnormality related to the peripheral 10.

Similarly, when, in the case of payment with cash, the communication interval from when communication accompanying the output of a drawer opening signal to the cash drawer 15 is terminated until communication accompanying the input of a drawer closed signal from the cash drawer 15 starts exceeds 60 seconds, which is a time limit, it is decided that there is an abnormality related to the peripheral 10. In addition, when, in the case of payment with a credit card, the communication interval from when communication accompanying the input of a payment completion notification by the CAT 14 is terminated until communication accompanying the output of receipt printing data to the printer 11 starts exceeds 3 seconds, which is a time limit, it is decided that there is an abnormality related to the peripheral 10.

The time limit is calculated according to the communication interval corresponding to the relevant target about which a decision is to be made, the communication interval being obtained from at least one piece of communication information stored in the communication information storage area 54*a*. The controller 50 calculates the average of communication intervals, for example, for each target about which a decision is to be made and obtains a predetermined multiple of the average as the time limit. For example, it will be assumed that the average of communication intervals from when communication accompanying the input of a received amount from the keyboard 12 is terminated until communication accompanying an input by the accounting button on the keyboard 12 starts is 30 seconds. Then, when the multiple is, for example, is 2, the controller 50 determines 60 seconds, which is twice 30 seconds, as the time limit.

The decision reference may not necessarily indicate a time limit for a communication interval between communications at consecutive positions in the communication sequence as indicated in FIGS. 4 and 5. For example, the decision reference may indicate a time limit for a communication interval between communication at the first position in the communication sequence and communication at the third position therein.

Next, flows of decision reference defining processing and abnormality decision processing will be described with reference to FIGS. 7 and 8. These pieces of processing are executed by the CPU 51 according to the failure detection application 82 read from the HDD 54.

Figure 7:
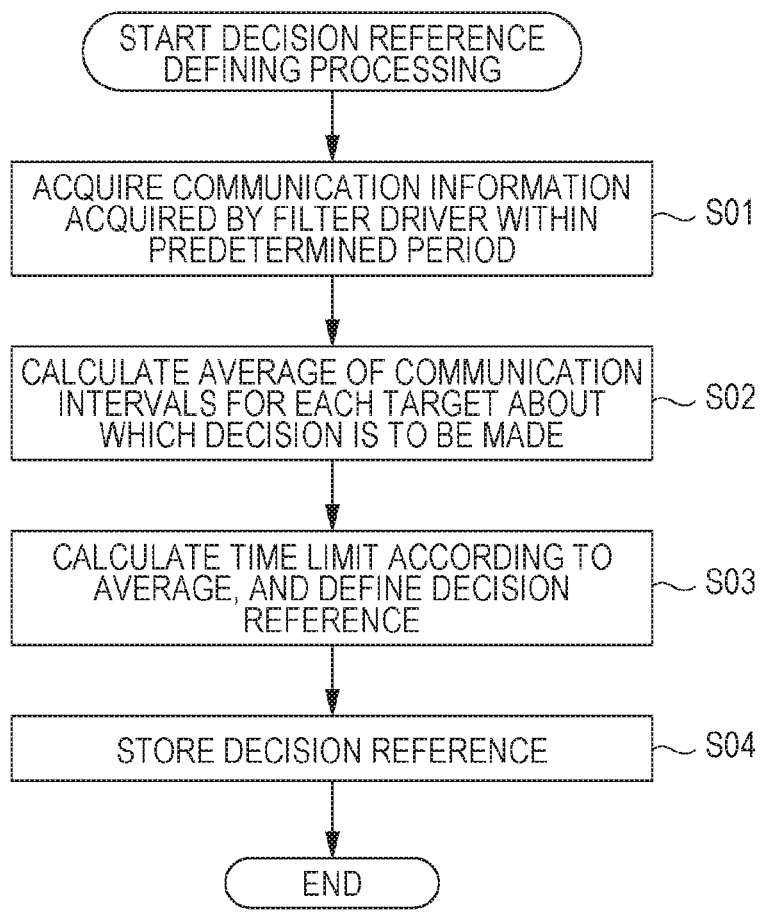
FIG. 7 is a flowchart illustrating a flow of decision reference defining processing.

FIG. 7 is a flowchart illustrating a flow of decision reference defining processing. In S01 in FIG. 7, the controller 50 acquires, from the communication information storage area 54*a*, communication information acquired by the filter driver 73 within a predetermined period. Communication information is information that is received and output between the POS application 81 and the device driver 72 and is then acquired by the filter driver 73, as described above.

The predetermined period may be a certain period such as several days or several weeks. Alternatively, the predetermined period may be a period until the number of times a predetermined trigger such as the activation of the POS terminal 1 reaches a predetermined number of times or may be a period from when the user issues a start command until the user issues an end command. Upon the completion of S01, the controller 50 proceeds to S02.

In S02, the controller 50 calculates the average of communication intervals for each target about which a decision is to be made, according to communication information acquired over the predetermined period in S01. As for the target about which a decision is to be made in the first decision reference J1 indicated in FIG. 6, when the communication interval in one of two pieces of communication information acquired over the predetermined period is 20 seconds and the communication interval in the other is 40 seconds, for example, the controller 50 calculates the average of communication intervals to be 30 seconds. Upon the completion of S02, the controller 50 proceeds to S03.

In S03, the controller 50 calculates a time limit according to the average calculated in S02, and defines a decision reference. For example, as a time limit, the controller 50 obtains a predetermined multiple of the average calculated in S02, the predetermined multiple being, for example, 60 seconds, which is twice 30 seconds. The controller 50 also defines, as a decision reference, information in which a target about which a decision is to be made and the calculated time limit are mutually associated. Upon the completion of S03, the controller 50 proceeds to S04.

In S04, the controller 50 stores the decision reference defined in S03 in the decision reference storage area 54b. Upon the completion of S04, the controller 50 terminates the decision reference defining processing.

Figure 8:
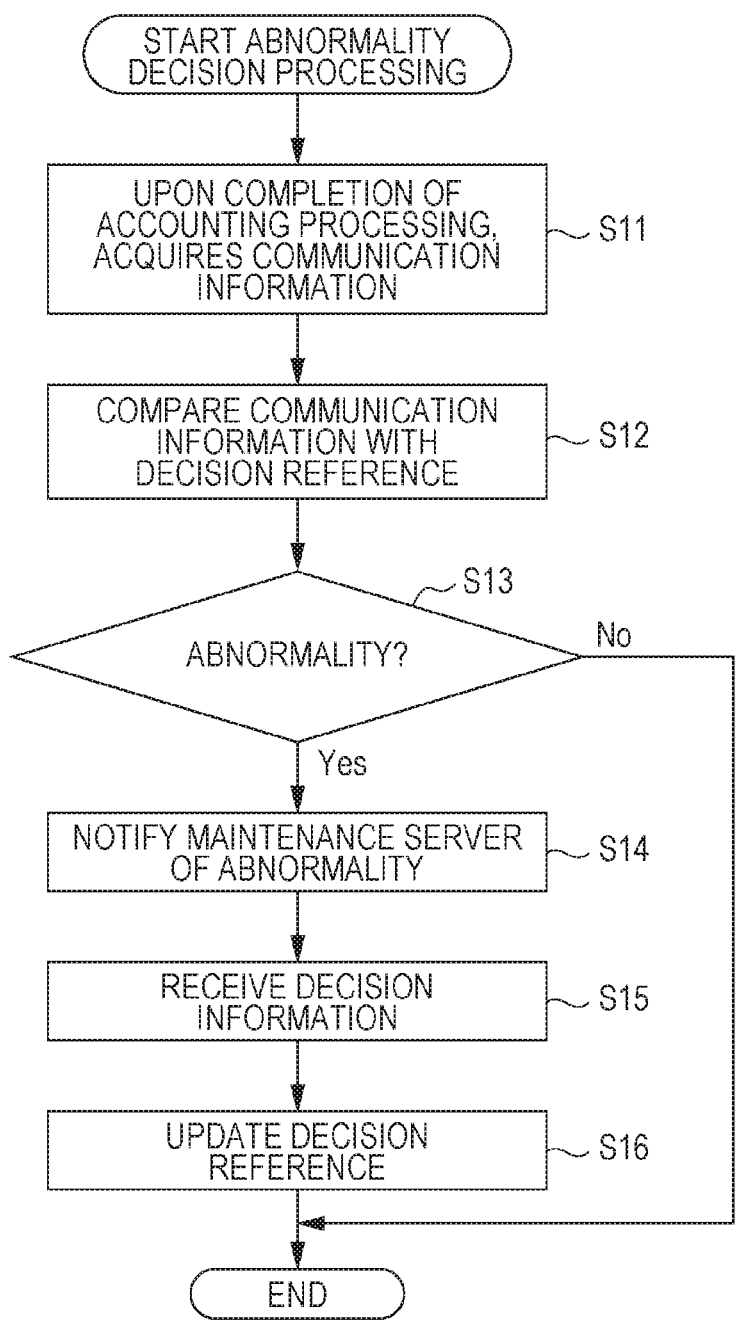
FIG. 8 is a flowchart illustrating a flow of abnormality decision processing.

FIG. 8 is a flowchart illustrating a flow of abnormality decision processing. Abnormality decision processing is executed after decision reference defining processing in FIG. 7 is executed, that is, after a decision reference is stored in the decision reference storage area 54b.

In S11 in FIG. 8, upon the completion of accounting processing, the controller 50 acquires at least one piece of communication information generated in transactions in accounting processing. An example of communication information is as illustrated in FIG. 4 or 5. Upon the completion of S11, the controller 50 proceeds to S12.

In S12, the controller 50 compares the communication information acquired in S11 with the decision reference stored in the decision reference storage area 54b. Specifically, the controller 50 decides whether communication information indicating a target about which a decision is to be made, the target being defined in the decision reference, is included in the communication information acquired in S11. When communication information indicating such a target is included, the controller 50 compares a communication interval between communications corresponding to the target about which a decision is to be made with the time limit in the decision reference. Upon the completion of S12, the controller 50 proceeds to S13.

In S13, according to the comparison result in S12, the controller 50 decides whether there is an abnormality related to the peripheral 10. Specifically, the controller 50 decides whether the communication interval between communications corresponding to the target, in the decision reference, about which a decision is to be made satisfies the condition for the time limit in the decision reference. When the condition is satisfied, the controller 50 decides that there is no abnormality related to the peripheral 10 (No in S13). When the condition is not satisfied, the controller 50 decides that there is an abnormality related to the peripheral 10 (Yes in S13). When the result in step S13 is No, the controller 50 terminates the abnormality decision processing. When the result in step S13 is Yes, the controller 50 proceeds to S14.

In S14, the controller 50 notifies the maintenance server 2 of the abnormality. Here, the controller 50 transmits, to the maintenance server 2, information indicating that the controller 50 decided that there is an abnormality related to the peripheral 10 and two pieces of communication information corresponding to the decision result indicating that there is an abnormality. On the same side as the maintenance server 2, a decision is made about the transmitted communication information as to whether to recognize the abnormality, after which the maintenance server 2 transmits, to the POS terminal 1, decision information indicating a result of the decision as to whether to recognize the abnormality. Upon the completion of S14, the controller 50 proceeds to S15.

In S15, the controller 50 receives the decision information from the maintenance server 2. Upon the completion of S15, the controller 50 proceeds to S16.

In S16, the controller 50 updates the decision reference according to the decision information received from the maintenance server 2. For example, it will be assumed that the controller 50 decides in S13 that there is an abnormality because a communication interval between communications corresponding to a target, in the decision reference, about which a decision is to be made is one second longer than the time limit, which is, for example, 60 seconds, defined in the decision reference, and that the controller 50 receives, from the maintenance server 2, decision information indicating that the abnormality should not be recognized. Then, the controller 50 prolongs the time limit to 61 seconds. Upon the completion of S16, the controller 50 terminates the abnormality decision processing.

As described above, the POS terminal 1 in this embodiment uses the failure detection application 82 to acquire communication information from the filter driver 73 over a predetermined period, the communication information being related to communication performed between the POS application 81 and a peripheral 10 through the device driver 72, after which the POS terminal 1 defines a decision reference according to the communication information acquired over the predetermined period, compares communication information acquired by the filter driver 73 after the predetermined period with the defined decision reference, and decides whether there is an abnormality related to the peripheral 10. Therefore, when an abnormality deciding function is to be added to the POS terminal 1, the POS application 81 does not need to be modified.

There may be a case in which the POS terminal 1 is coupled to peripherals 10 through serial interfaces and thereby cannot monitor the states of the peripherals 10 in a unified manner. Even in this case, when the POS terminal 1 defines a decision reference according to communication information acquired over a predetermined period, the POS terminal 1 can make a decision about an abnormality related to the peripheral 10.

Since the POS terminal 1 receives decision information from the maintenance server 2 and updates the decision reference according to the received decision information, the POS terminal 1 can define a more appropriate decision reference. Thus, the POS terminal 1 can make a more appropriate decision about an abnormality related to the peripheral 10.

Besides the above embodiment, variations described below can be used.

First Variation

In the embodiment described above, the controller 50 has calculated the average of communication intervals for each target about which a decision is to be made, and has obtained a predetermined multiple of the average as the time limit. However, a time limit may be a time obtained by adding a predetermined time to the average of communication intervals. Alternatively, the controller 50 may calculate a standard deviation by performing statistical collection over a predetermined period, and may calculate a time limit according to the two-sigma or three-sigma range of the standard deviation.

Second Variation

In S14 in abnormality decision processing illustrated in FIG. 8, the controller 50 has transmitted, to the maintenance server 2, information indicating that the controller 50 decided that there is an abnormality related to the peripheral 10 and communication information corresponding to the decision result indicating that there is an abnormality. However, the controller 50 may transmit all pieces of communication information acquired in S11. In this case, on the same side as the maintenance server 2, decision information indicating whether to recognize the abnormality may be created according to all pieces of communication information acquired in one piece of accounting processing.

Also in this case, the controller 50 may define a decision reference for each pattern in accounting processing (for example, for each payment method such as payment with cash or payment with a credit card), and may store a decision reference for each pattern. Thus, for a single target about which a decision is to be made, different time limits can be set for payment with cash and payment with a credit card.

For each pattern in accounting processing, the controller 50 may store a decision reference in which positions in a communication sequence are defined. In this case, when the event occurrence sequence in the acquired communication information differs from the communication sequence in the decision reference, the controller 50 decides that there is an abnormality related to the peripheral 10.

Third Variation

In S13 in abnormality decision processing illustrated in FIG. 8, only when the controller 50 decides that there is an abnormality, the controller 50 has transmitted communication information to the maintenance server 2. However, the controller 50 may transmit communication information to the maintenance server 2 together with a decision result, regardless of whether the controller 50 has decided that there is an abnormality. In this case, the maintenance server 2 may be structured so that only when it is decided on the same side as the maintenance server 2 that the decision result is not appropriate, the maintenance server 2 transmits decision information to the POS terminal 1.

Fourth Variation

In S13 in abnormality decision processing, when the controller 50 decides that there is an abnormality, the controller 50 may not only notify the maintenance server 2 but also may make a notification of the abnormality to indicate, on the POS terminal 1, the abnormality to the operator of the POS terminal 1. For example, when the peripheral 10 includes a customer display on which the amount of a product and a total amount are displayed, the controller 50 may display a message indicating the abnormality on the customer display.

Fifth Variation

An automatic change machine may be added as an peripheral 10. In this case, a decision reference may be set for a communication interval from when communication accompanying an input by an adjustment button is terminated until communication accompanying the reception of an accounting receipt by the person at the checkout counter.

Sixth Variation

A magnetic stripe card reader may be added as an peripheral 10. A magnetic stripe card reader is used to take an input from a credit card, a member card, a debit card, or the like. In addition, an integrated circuit (IC) card reader used for electronic money payment or a two-dimensional code reader used for two-dimensional code payment may be added as an peripheral 10.

Seventh Variation

In the embodiment described above, the controller 50 has acquired communication information received and output between the POS application 81 and the device driver 72 by using the filter driver 73. However, a printer driver provided by the manufacturer of the printer 11 or a UPOS, which is a standard in POS, may be provided in the application layer 80 so that communication information passing through the driver can also be acquired. Specifically, the controller 50 may be structured so that it can also acquire communication information received or output in an order starting from the POS application 81, followed by the printer driver and device driver 72 in that order or in the reverse order, or communication information received or output in an order starting from the POS application 81, followed by the UPOS driver and device driver 72 in that order or in the reverse order. The POS terminal 1 in the above embodiment acquires communication information by using the filter driver 73 incorporated into the operating system layer 70. Therefore, even in the structure in which a printer driver or UPOS driver is provided as described above, the POS terminal 1 can acquire communication information and can make a decision about an abnormality related to the peripheral 10 without having to modify the POS application 81.

Eighth Variation

In the embodiment described above, the communication information storage area 54a in which communication information is stored has been provided in the POS terminal 1. However, the communication information storage area 54a may be provided outside the POS terminal 1, that is, in an apparatus that can communicate with the POS terminal 1.

Ninth Variation

The failure detection application 82 may be provided in the maintenance server 2. In this case, it suffices for the POS terminal 1 to transmit communication information to the maintenance server 2 each time communication information is generated or accounting processing is terminated. It also suffices for the maintenance server 2 to execute decision reference defining processing and abnormality deciding processing according to the communication information transmitted from the POS terminal 1. In this case, for each POS terminal 1, the maintenance server 2 may acquire communication information, may define a decision reference, and may make a decision about an abnormality. Alternatively, the maintenance server 2 may define a decision reference common to a plurality of POS terminals 1 according to communication information acquired from the plurality of POS terminals 1, and may make a decision about an abnormality related to the peripherals 10 coupled to each POS terminal 1 according to the defined common decision reference.

Tenth Variation

In the embodiment described above, the operator of the maintenance server 2 has made a decision about the communication information transmitted from the POS terminal 1 as to whether to recognize the abnormality. However, a controller in the maintenance server 2 may read out a program stored in a storage in the maintenance server 2 and may execute the program to make a decision about the communication information transmitted from the POS terminal 1 as to whether to recognize the abnormality. In this case, it suffices for the controller in the maintenance server 2 to create decision information indicating whether to recognize the abnormality and transmit the created decision information to the POS terminal 1.

Eleventh Variation

In the embodiment described above, the controller 50 has updated the decision reference stored in advance, according to decision information received from the maintenance server 2. However, the controller 50 may define a decision reference according to decision information received from the maintenance server 2, and may store the defined decision reference in the decision reference storage area 54*b*. In this case, it suffices for the maintenance server 2 to create, as decision information, a decision reference (see FIG. 6) in which a target about which a decision is to be made and a time limit are mutually associated, according to communication information transmitted from the POS terminal 1, and then to transmit the created decision information to the POS terminal 1.

Twelfth Variation

In the embodiment described above, when a communication interval from when communication accompanying the occurrence of one event is terminated until communication accompanying the occurrence of another event starts is within a time limit in the decision reference, it has been decided that there is no abnormality related to the peripheral 10. However, a time range may be used as a condition. Specifically, a time limit in the decision reference may be defined as "at least XX seconds and at most YY seconds", for example.

Thirteenth Variation

In the embodiment described above, communication information acquired by the filter driver 73 has included a communication sequence, events, and communication intervals. However, a communication sequence and communication intervals may be added to communication information, acquired by the filter driver 73, indicating a communication sequence by the failure detection application 82.

Fourteenth Variation

It is also possible to provide methods of executing the individual pieces of processing, described in the above embodiment and variations, in the POS terminal 1 and programs that execute these pieces of processing, in the form of a type of storage medium such as a compact disc-read-only memory (CD-ROM) or flash memory in which the programs are stored so that the programs can be read by any of controllers including a computer and a processor. These aspects are also included in the scope of the rights of the present disclosure. In the embodiment described above, the communication system SY has included the POS terminal 1, peripherals 10, and maintenance server 2. However, the communication system SY may lack the maintenance server 2. In addition, modifications can be appropriately made without departing from the scope of the present disclosure.

Notes

A method of controlling an information processor, a non-transitory controller-readable medium storing a program, and a communication system will be additionally described below.

A method of controlling a POS terminal 1 is a method of controlling a POS terminal 1 configured to communicate with a peripheral 10, the POS terminal 1 having a device driver 72, a POS application 81 configured to communicate with the peripheral 10 through the device driver 72, and a filter driver 73 configured to acquire communication information related to communication performed between the POS application 81 and the peripheral 10 through the device driver 72. The method includes: acquiring communication information from the filter driver 73 over a predetermined period; storing the acquired communication information in a communication information storage area 54*a*; defining a decision reference according to which a decision is made about an abnormality caused during communication with the peripheral 10 or an abnormality in the peripheral 10, according to the communication information stored in a communication information storage area 54*a*; and making a decision about an abnormality caused during communication with the peripheral 10 or an abnormality in the peripheral 10 through a comparison between the defined decision reference and communication information acquired from the filter driver 73 after the predetermined period.

A failure detection application 82 causes a controller 50 in a POS terminal 1 configured to communicate with a peripheral 10, the POS terminal 1 having a device driver 72, a POS application 81 configured to communicate with the peripheral 10 through the device driver 72, and a filter driver 73 configured to acquire communication information related to communication performed between the POS application 81 and the peripheral 10 through the device driver 72, to execute acquiring communication information from the filter driver 73 over a predetermined period and storing the acquired communication information in a communication information storage area 54*a*, defining a decision reference according to which a decision is made about an abnormality caused during communication with the peripheral 10 or an abnormality in the peripheral 10, according to the communication information stored in the communication information storage area 54*a*, and making a decision about an abnormality caused during communication with the peripheral 10 or an abnormality in the peripheral 10 through a comparison between the defined decision reference and communication information acquired from the filter driver 73 after the predetermined period. The POS application 81, failure detection application 82, device driver 72, and filter driver 73 can be stored in a storage medium such as the HDD 54 readable by the CPU 51. In addition, these can also be provided by being stored in any of various storage media readable by the CPU 51, such as a CD-ROM and a flash memory.

A communication system SY has a peripheral 10 and a POS terminal 1 configured to have a device driver 72, a POS application 81 configured to communicate with the peripheral 10 through the device driver 72, a filter driver 73 configured to acquire communication information related to communication performed between the POS application 81 and the peripheral 10 through the device driver 72, and a failure detection application 82 configured to acquire communication information from the filter driver 73 over a predetermined period, define a decision reference according to which a decision is made about an abnormality caused during communication with the peripheral 10 or an abnormality in the peripheral 10, according to the communication information acquired over the predetermined period, and make a decision about an abnormality caused during communication with the peripheral 10 or an abnormality in the peripheral 10 through a comparison between the defined decision reference and communication information acquired from the filter driver 73 after the predetermined period.

With this structure, the POS terminal 1 acquires communication information from the filter driver 73 over a predetermined period, the communication information being related to communication performed between the POS application 81 and the peripheral 10 through the device driver 72, defines a decision reference according to which a decision is made about an abnormality caused during communication with the peripheral 10 or an abnormality in the peripheral 10, according to the communication information acquired over the predetermined period, and makes a decision about an abnormality caused during communication with the peripheral 10 or an abnormality in the peripheral 10 through a comparison between the defined decision reference and communication information acquired by the filter driver 73 after the predetermined period. Therefore, when an abnormality deciding function is to be added to the POS terminal 1, the POS application 81 does not need to be modified. It may be difficult to detect an abnormality caused during communication with the peripheral 10 or an abnormality in the peripheral 10 depending on, for example, the form of coupling to the peripheral 10. Even in this case, since a decision reference is defined according to communication information acquired over a predetermined period, it is possible to make a decision about an abnormality caused during communication with the peripheral 10 or an abnormality in the peripheral 10, regardless of the form of coupling to the peripheral 10.

In the above method of controlling the POS terminal 1, communication is preferably performed with a plurality of peripherals 10, and the communication information preferably includes information indicating a communication sequence in communication with the plurality of peripherals 10.

With this structure, the POS terminal 1 can make a decision about an abnormality caused during communication with the peripheral 10 or an abnormality in the peripheral 10 according to information indicating a communication sequence in communication with a plurality of peripherals 10.

In the above method of controlling the POS terminal 1, the communication information preferably includes information indicating a time interval from when communication with one peripheral 10 is terminated until communication with another peripheral 10 starts.

With this structure, the POS terminal 1 can make a decision about an abnormality caused during communication with the peripheral 10 or an abnormality in the peripheral 10 according to information indicating a time interval from when communication with one peripheral 10 is terminated until communication with another peripheral 10 starts.

In the above method of controlling the POS terminal 1, the communication information is preferably involved in a transaction in accounting processing.

With this structure, the POS terminal 1 can make a decision about an abnormality caused during communication with the peripheral 10 or an abnormality in the peripheral 10 according to information involved in a transaction in accounting processing.

In the above method of controlling the POS terminal 1, communication with the maintenance server 2 other than the peripheral 10 is preferably performed, and it is preferable to transmit the acquired communication information to the maintenance server 2, to receive, from the maintenance server 2, decision information indicating a result of a decision as to whether to recognize the abnormality, and to define or update the decision reference according to the received decision information.

With this structure, since the POS terminal 1 defines or updates the decision reference according to the decision information received from the maintenance server 2, the POS terminal 1 can define a more appropriate decision reference. Thus, the POS terminal 1 can make a more appropriate decision about an abnormality caused during communication with the peripheral 10 or an abnormality in the peripheral 10.

What is claimed is:

1. A method of controlling an information processor configured to communicate with a peripheral, the information processor having a device driver, an application configured to communicate with the peripheral through the device driver, and a filter driver configured to acquire communication information related to communication performed between the application and the peripheral through the device driver, the method comprising:
   acquiring communication information from the filter driver over a predetermined period, the communication information comprising a communication sequence of a plurality of events for a transaction and a communication interval from an occurrence of one event to an occurrence of a next event;
   defining a decision reference according to which a decision is made about an abnormality caused during communication with the peripheral or an abnormality in the peripheral by calculating a time limit based in part upon an average of the communication interval; and
   making a decision about an abnormality caused during communication with the peripheral or an abnormality in the peripheral through a comparison between the defined decision reference and communication information acquired from the filter driver after the predetermined period.

2. The method according to claim 1, wherein:
   communication is performed with a plurality of peripherals; and
   the communication information includes information indicating the communication sequence in communication with the plurality of peripherals.

3. The method according to claim 2, wherein the communication information includes communication interval indicating a time interval from when communication with one peripheral is terminated until communication with another peripheral starts.

4. The method according to claim 1, wherein the communication information is involved in a transaction in accounting processing.

5. The method according to claim 1, wherein communication with an external server other than the peripheral is performed, the method comprising:
   transmitting the acquired communication information to the external server and receiving, from the external server, decision information indicating a result of a decision as to whether to recognize the abnormality; and
   defining or updating the decision reference according to the received decision information.

6. A non-transitory controller-readable medium storing a program causing a processor in an information processor configured to communicate with a peripheral, the information processor having a device driver, an application configured to communicate with the peripheral through the device driver, and a filter driver configured to acquire communication information related to communication performed between the application and the peripheral through the device driver, to:
   acquire communication information from the filter driver over a predetermined period, the communication information comprising a communication sequence of a plurality of events for a transaction and a communication interval from an occurrence of one event to an occurrence of a next event;

define a decision reference according to which a decision is made about an abnormality caused during communication with the peripheral or an abnormality in the peripheral by calculating a time limit based in part upon an average of the communication interval; and make a decision about an abnormality caused during communication with the peripheral or an abnormality in the peripheral through a comparison between the defined decision reference and communication information acquired from the filter driver after the predetermined period.

7. The medium according to claim 6, wherein:

communication is performed with a plurality of peripherals; and the communication information includes information indicating a communication sequence in communication with the plurality of peripherals.

8. The medium according to claim 7, wherein the communication information includes communication interval indicating a time interval from when communication with one peripheral is terminated until communication with another peripheral starts.

9. The medium according to claim 6, wherein the communication information is involved in a transaction in accounting processing.

10. The medium according to claim 6, wherein:

the information processor is configured to communicate with an external server other than the peripheral; and the program causes the processor in the information processor to transmit the acquired communication information to the external server and receive, from the external server, decision information indicating a result of a decision as to whether to recognize the abnormality, and define or update the decision reference according to the received decision information.

11. A communication system comprising:

a peripheral; and an information processor configured to have a device driver, a first application configured to communicate with the peripheral through the device driver, a filter driver configured to acquire communication information related to communication performed between the first application and the peripheral through the device driver, and a second application configured to acquire communication information from the filter driver over a predetermined period, to define a decision reference according to which a decision is made about an abnormality caused during communication with the peripheral or an abnormality in the peripheral, according to the acquired communication information, and to make a decision about an abnormality caused during communication with the peripheral or an abnormality in the peripheral through a comparison between the defined decision reference and communication information acquired from the filter driver after the predetermined period, wherein the communication information comprises a communication sequence of a plurality of events for a transaction and a communication interval from an occurrence of one event to an occurrence of a next event, and defining the decision reference comprises calculating a time limit based in part upon an average of the communication interval.

12. The communication system according to claim 11, wherein:

the information processor communicates with a plurality of peripherals; and the communication information includes information indicating a communication sequence in communication with the plurality of peripherals.

13. The communication system according to claim 12, wherein the communication information includes communication interval indicating a time interval from when communication with one peripheral is terminated until communication with another peripheral starts.

14. The communication system according to claim 11, wherein the communication information is involved in a transaction in accounting processing.

15. The communication system according to claim 11, wherein:

the information processor is configured to communicate with an external server other than the peripheral; and the information processor transmits the acquired communication information to the external server and receives, from the external server, decision information indicating a result of a decision as to whether to recognize the abnormality, and defines or updates the decision reference according to the received decision information.

* * * * *